US011735067B1

(12) United States Patent
Batista-Gonzalez et al.

(10) Patent No.: US 11,735,067 B1
(45) Date of Patent: Aug. 22, 2023

(54) IN VITRO DYNAMIC MOUTH SIMULATOR

(71) Applicant: NotCo Delaware, LLC, Santiago (CL)

(72) Inventors: Ana Batista-Gonzalez, Santiago (CL); Rocío de la Llera-Kurth, Santiago (CL); Francisca Villanueva, Santiago (CL); Sofía Estrugo, Santiago (CL); Angeline Riquelme, Santiago (CL); Rodrigo A. Contreras, Santiago (CL)

(73) Assignee: NotCo Delaware, LLC, Santiago (CL)

( * ) Notice: Subject to any disclaimer, the term of this patent is extended or adjusted under 35 U.S.C. 154(b) by 0 days.

(21) Appl. No.: 17/969,805

(22) Filed: Oct. 20, 2022

Related U.S. Application Data

(60) Provisional application No. 63/322,284, filed on Mar. 22, 2022.

(51) Int. Cl.
*G09B 23/32* (2006.01)
*G09B 23/30* (2006.01)
*G09B 23/34* (2006.01)

(52) U.S. Cl.
CPC ........... *G09B 23/32* (2013.01); *G09B 23/303* (2013.01); *G09B 23/34* (2013.01)

(58) Field of Classification Search
CPC ...... G09B 23/32; G09B 23/303; G09B 23/34; G01N 33/02; G01N 3/02
See application file for complete search history.

(56) References Cited

U.S. PATENT DOCUMENTS

| | | | |
|---|---|---|---|
| 4,073,071 A | 2/1978 | Angelotti | |
| 4,209,919 A | 7/1980 | Kirikae et al. | |
| 5,338,198 A | 8/1994 | Wu et al. | |
| 6,623,271 B2 | 9/2003 | Pruden | |
| 8,703,479 B2 | 4/2014 | Marzorati et al. | |
| 2003/0041602 A1 | 3/2003 | Williams et al. | |

(Continued)

FOREIGN PATENT DOCUMENTS

| | | |
|---|---|---|
| CN | 202330391 U | 7/2012 |
| CN | 101665758 B | 8/2012 |

(Continued)

OTHER PUBLICATIONS

Barroso et al., The Computer-Controlled Multicompartmental Dynamic Model of the Gastrointestinal System SIMGI. In: Verhoeckx K, Cotter P, López-Expósito I, et al., editors. The Impact of Food Bioactives on Health: in vitro and ex vivo models [Internet]. Cham (CH): Springer; 2015. Chapter 28. Available from: https://www.ncbi.nlm.nih.gov/books/NBK500139/. 9 pages.

(Continued)

*Primary Examiner* — Francis C Gray
(74) *Attorney, Agent, or Firm* — Haverstock & Owens, A Law Corporation

(57) ABSTRACT

An in vitro dynamic mouth model includes an upper jaw that includes a plurality of protuberances simulating human teeth, a lower jaw that is coupled with a rounded silicone pad simulating human tongue, and a mouth wall that encapsulates food sample(s) subjected to in vitro mastication such that the food sample remains within the mouth model. The mouth wall contains at least one hole that allows injection of simulated saliva fluid. As simulated chewing takes place, the injected fluid directly interacts with the food sample.

20 Claims, 7 Drawing Sheets

(56) References Cited

U.S. PATENT DOCUMENTS

| | | | | |
|---|---|---|---|---|
| 2009/0312671 A1* | 12/2009 | Miura | ............... | A61C 19/04 |
| | | | | 600/590 |
| 2014/0272875 A1* | 9/2014 | Francois | ............... | G09B 23/283 |
| | | | | 434/270 |
| 2016/0327537 A1* | 11/2016 | Park | ............... | G01N 33/02 |
| 2019/0228681 A1 | 7/2019 | Zhan et al. | | |
| 2022/0003734 A1* | 1/2022 | Yoon | ............... | G01N 3/08 |

FOREIGN PATENT DOCUMENTS

| | | | | |
|---|---|---|---|---|
| CN | 203596135 U | | 5/2014 | |
| CN | 104698141 A | | 6/2015 | |
| CN | 105929121 A | | 7/2018 | |
| CN | 105954476 A | | 2/2019 | |
| CN | 107063904 B | * | 8/2019 | ............ G01N 11/00 |
| CN | 110231437 A | | 9/2019 | |
| CN | 209461034 U | * | 10/2019 | ............ G09B 25/02 |
| CN | 112326903 A | | 2/2021 | |
| CN | 112029663 B | | 9/2021 | |
| DE | 19614670 A1 | * | 10/1997 | ............ A61C 19/04 |
| FR | 3007181 A1 | | 11/2016 | |
| JP | 5062590 B2 | | 10/2012 | |
| WO | 2012/001314 A1 | | 1/2012 | |
| WO | 2012165962 A1 | | 12/2012 | |
| WO | 2013144710 A1 | | 10/2013 | |
| WO | WO-2022104490 A1 | * | 5/2022 | |

OTHER PUBLICATIONS

Van de Wiele et al., The Simulator of the Human Intestinal Microbial Ecosystem (SHIME®) In: Verhoeckx K, Cotter P, López-Expósito I, et al., editors. The Impact of Food Bioactives on Health: in vitro and ex vivo models [Internet]. Cham (CH): Springer; 2015. Chapter 27. Available from: https://www.ncbi.nlm.nih.gov/books/NBK500150/. 13 pages.

Fujio-Vejar et al. "The Gut Microbiota of Healthy Chilean Subjects Reveals a High Abundance of the Phylum Verrucomicrobia". Frontiers in Microbiology, Jun. 2017 vol. 8 Article 1221, 12 pages.

Brodkorb et al. "INFOGEST static in vitro simulation of gastrointestinal food digestion", Nature Protocols, Mar. 18, 2019, 24 pages.

Mackie et al. "Simulating human digestion: developing our knowledge to create healthier and more sustainable foods", The Royal Society of Chemistry, Oct. 22, 2020, 35 pages.

Minekus et al., "A Multicompartmental Dynamic Computer-Controlled Model Simulating the Stomach and Small Intestine", Alternatives to Laboratory Animals: ATLA 23, 197-209, Mar. 1995, 14 pages.

Molly et al. "Development of a 5-step multi-chamber reactor as a simulation of the human intestinal microbial ecosystem", Applied Microbiology and Biotechnology (1993) 39: 254-258, 5 pages.

Mulet-Cabero et al., "A standardised semi-dynamic in vitro digestion method suitable for food—an international consensus", The Royal Society of Chemistry, Feb. 10, 2020, 19 pages.

Tamargo et al, "Simulador gastrointestinal dinámico (simgi®): una herramienta potencialmente útil en nutrición clínica", Nutr Hosp. 2017; 34(6): 1489-1496 ISSN 0212-1611—CODEN NUHOEQ S.V.R. 318, 8 pages.

González et al., "Simulation of Human Small Intestinal Digestion of Starch Using an In Vitro System Based on a Dialysis Membrane Process", Foods 2020, 9, 913, Jul. 10, 2020, 22 pages.

Barros et al., "Development of an in vitro mechanical gastric system (IMGS) with realistic peristalsis to assess lipid digestibility", unedited manuscript accepted for publication in Food Research International (2016), 41 pages.

Williams et al., "Comparative Analysis of Intestinal Tract Models," Annual Review of Food Science and Technology 2015.6:14.1-14.22, Feb. 2015, 23 pages.

International Searching Authority, "Search Report" in application No. PCT/US2022/047994, dated Feb. 10, 2023, 8 pages.

International Searching Authority, "Search Report" in application No. PCT/US2022/047980, dated Feb. 10, 2023, 8 pages.

csiro.au, "Virtual Mouth", https://www.csiro.au/en/research/technology-space/it/virtual-mouth?utm_source=D61SocialMedia&utm_medium=hyperlink&utm_campaign=VirtualMouth, last viewed May 17, 2023, 4 pages.

* cited by examiner

IN VITRO DYNAMIC MOUTH SIMULATOR

BENEFIT CLAIM

This application claims the benefit under 35 U.S.C. § 119(e) of provisional application 63/322,284, filed Mar. 22, 2022, the entire contents of which are hereby incorporated by reference for all purposes as if fully set forth herein.

TECHNICAL FIELD

One technical feature of the present disclosure is a dynamic simulator of the human mouth. The disclosure relates, in particular, to an in vitro mouth model that simulates human oral mastication.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Studying food digestion is relevant for the food industry, to know how different ingredients and food matrices affect nutrient bioavailability. Food digestion is studied using mainly in vitro systems that include a gastric compartment and an intestinal compartment that replicate the chemical and physical environment of the gastrointestinal tract. However, chemical and physical reactions that happen in the mouth during oral digestion are performed using different equipment and methodologies in studies. Although the oral mastication and digestion last only a few seconds, the degree to which food is broken during this process could determine the efficiency of the digestion process.

Traditional equipment used during oral digestion include kitchen meat mincers and blenders. However, these traditional equipment do not simulate the human oral mastication process.

What is needed is a simulator that mimics oral mastication by using fluids and mechanical parameters that are the same or substantially similar to those of the human oral mastication process.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:
1.0 GENERAL OVERVIEW
2.0 STRUCTURAL OVERVIEW
3.0 FUNCTIONAL OVERVIEW
4.0 MOUTH MODEL FEATURES
5.0 OTHER ASPECTS OF DISCLOSURE
\*

1.0 General Overview

Techniques described herein relate to an in vitro dynamic mouth model that simulates human oral mastication. In embodiments of the mouth model of the present invention, an upper jaw includes a plurality of protuberances simulating human teeth, a lower jaw is coupled with a rounded silicone pad simulating human tongue, and a mouth wall encapsulates food sample(s) that is subjected to in vitro mastication such that it remains within the mouth model during mastication. The mouth wall contains at least one hole that allows for addition/injection of simulated saliva fluid. As simulated (mechanical) chewing takes place, the injected fluid directly interacts with the food sample. The mouth model simulates human oral mastication, which allows for chewing and digestion of food, using the same or substantially similar fluids and mechanical parameters as those of the process in humans. Food bolus ("chewed" food) may be collected and/or transferred for subsequent in vitro gastrointestinal digestion.

In one aspect, a system is provided. The system comprises a mouth model. The mouth model includes an upper jaw comprising a neck and a plurality of protrusions, a lower jaw comprising a central recess, a compressible pad coupled to the central recess of the lower jaw, and a mouth wall comprising an aperture on a top surface of the mouth wall and a side surface for removably coupling with the lower jaw. The mouth model also includes a piston configured to be inserted through the aperture of the mouth wall and removably coupled with the neck of the upper jaw.

In another aspect, a method is provided. The method comprises coupling a first end of a piston to a neck of an upper jaw, inserting a second end of the piston through an aperture of a mouth wall, forming an interior chamber using a lower jaw and the mouth wall, fluidly coupling at least one fluid source with the interior chamber, using the piston to alternate between decreasing and increasing a size of the interior chamber, and while using the piston, transferring fluid from the at least one fluid source to the interior chamber.

Other embodiments, aspects, features, and advantages will become apparent from the reminder of the disclosure as a whole.

2.0 Structural Overview

Figure 1B:
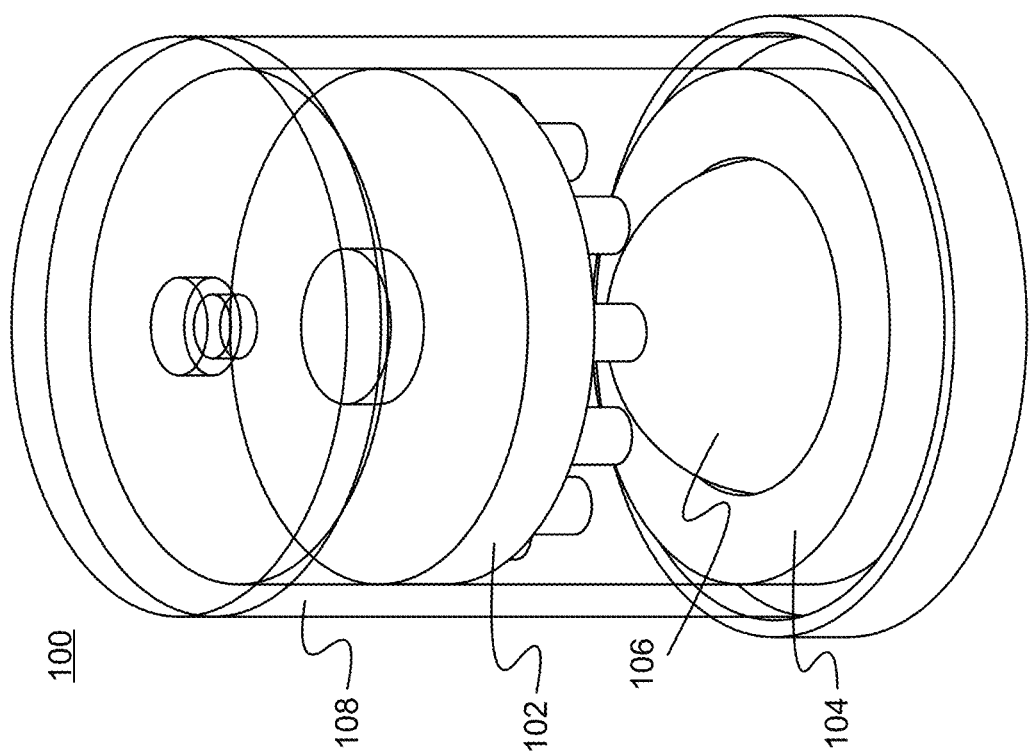
FIGS. 1A and 1B illustrate various schematic views of a mouth model that simulates human oral mastication, according to an embodiment.
Figure 1A:
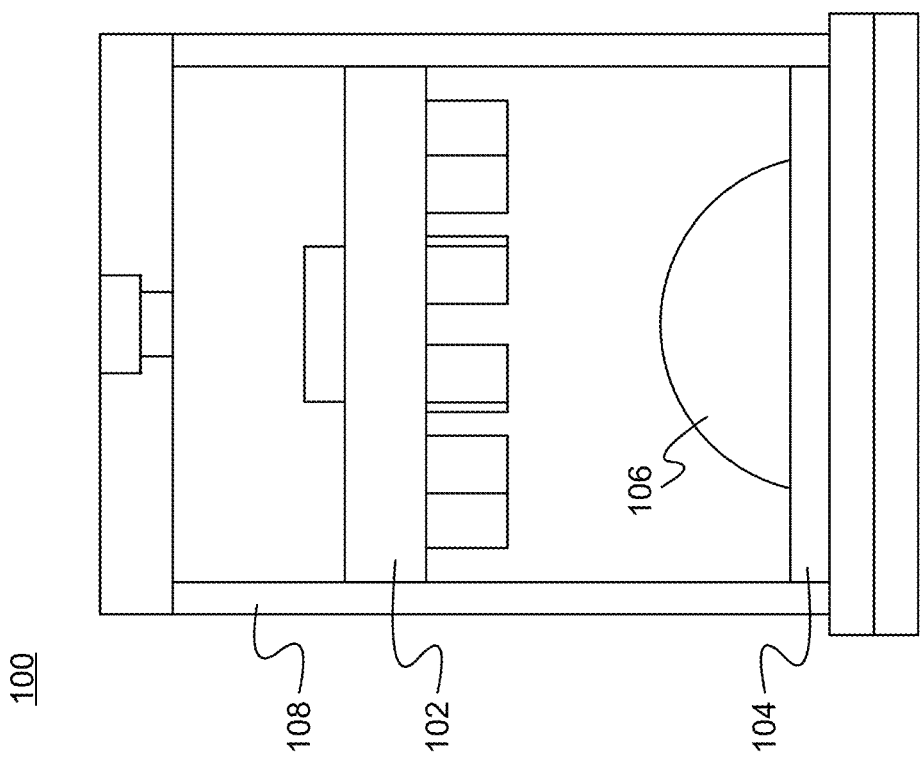

FIGS. 1A and 1B illustrate various schematic views of a mouth model 100 that simulates human oral mastication, according to an embodiment. The mouth model 100 includes an upper jaw 102 (also referred to as superior jaw or mobile jaw), a lower jaw 104 (also referred to inferior jaw or stationary jaw), a tongue pad 106, and a mouth wall 108. When assembled, the upper jaw 102, a portion of the lower jaw 104, and the tongue pad 106 are positioned within the mouth wall 108.

Upper Jaw.

Figure 2:
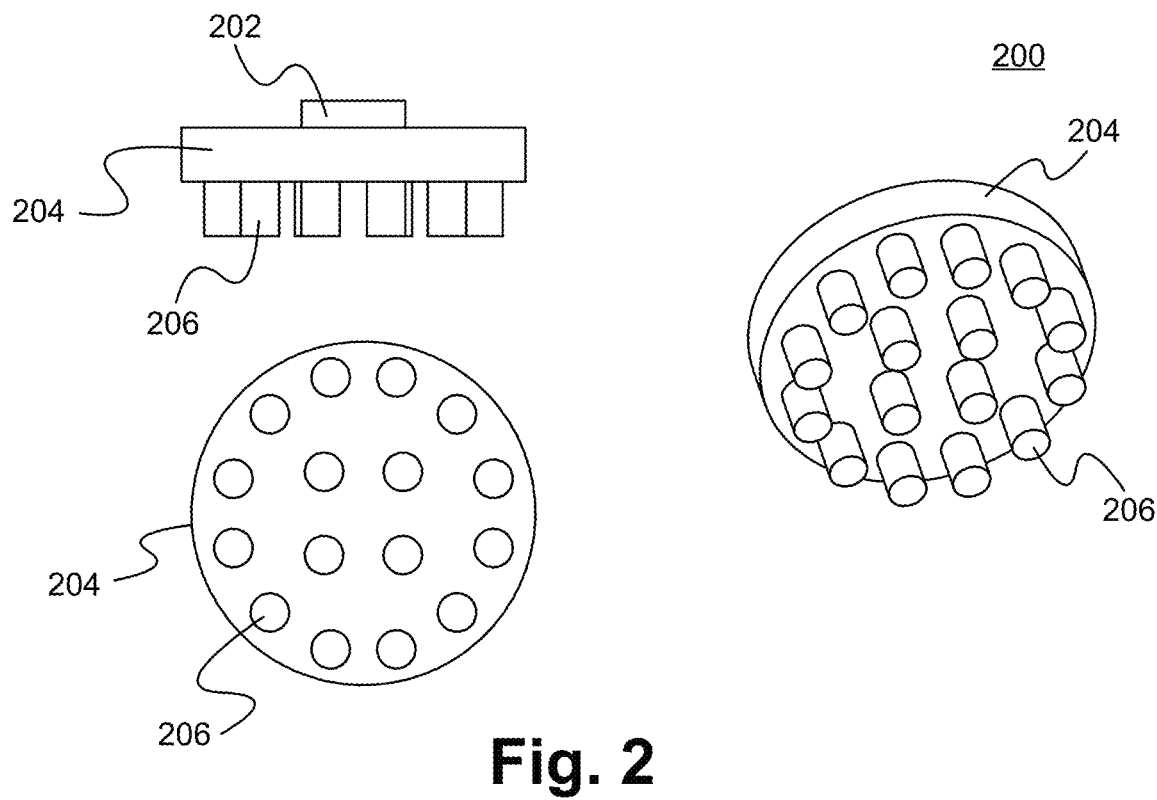
FIG. 2 illustrates different perspectives of an example upper jaw, according to an embodiment.

When the mouth model 100 is assembled, the upper jaw 102 is moveably positioned within the mouth model 100 to simulate human chewing. The upper jaw 102 repeatedly moves between an open jaw position and a closed jaw position within the mouth model 100. For example, an open jaw position may be when the upper jaw 102 is at a location within the mouth model 100 that is not in contact with the lower jaw 104, the tongue pad 106, or both. A closed jaw position may be when the upper jaw 102 is at a location within the mouth model 100 that is in contact with the lower jaw 104, the tongue pad 106, or both. FIG. 2 illustrates different perspectives of an example upper jaw 200, including a side perspective, a bottom perspective, and a side-bottom perspective. The upper jaw 102 is similarly configured as the upper jaw 200.

The upper jaw 200 includes a base 204, a neck 202 coupled to a top surface of the base 204, and a plurality of protrusions 206 coupled to a bottom surface of the base 204. In an embodiment, the neck 202 is adapted and configured to couple with a piston (not illustrated in FIG. 2). The piston facilitates movement of the upper jaw 200 within the mouth model 100 (e.g., between an open jaw position and a closed jaw position). As shown in FIG. 2, the plurality of protrusions 206 include 16 cylindrical protuberances at the bottom surface of the base 204 to simulate human teeth, although more or less as well as other shapes are contemplated. The dimensions of each "tooth" are approximately 10 mm tall and approximately 7.5 mm wide, although other dimensions are also contemplated. For example, each of the protrusions 206 may be sized differently from other protrusions. Also as shown in FIG. 2, some of the "teeth" are positioned around the circumference of the base 204, while others are positioned centrally on the base 204. In an embodiment, the upper jaw 200 may only have "teeth" that are positioned around the circumference of the base 204 (e.g., no "teeth" are directly above the tongue pad 106), or the upper jaw 200 may only have "teeth" that are positioned centrally on the base 204.

Lower Jaw.

Figure 3:
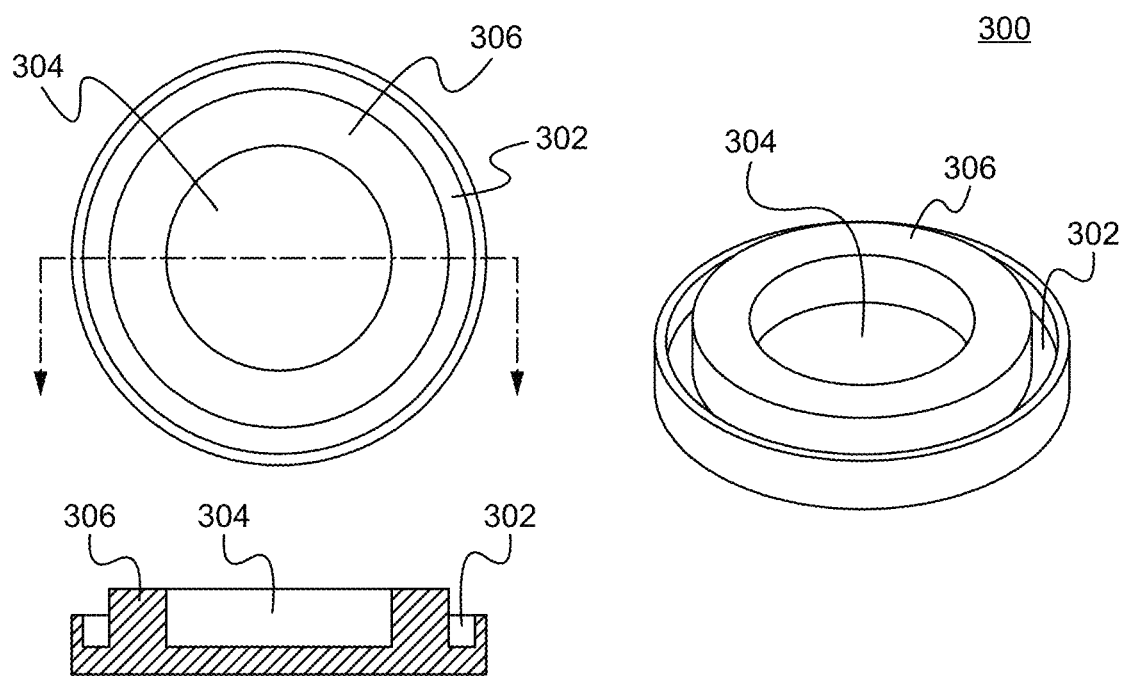
FIG. 3 illustrates different perspectives of an example lower jaw, according to an embodiment.

When the mouth model 100 is assembled, the lower jaw 104 is located at the bottom of the mouth model 100. The lower jaw 104 serves numerous functions, including forming an interior chamber (mouth cavity) of the mouth model 100 when it is removably coupled with the mouth wall 108. FIG. 3 illustrates different perspectives of an example lower jaw 300, including a top perspective, a side perspective, and a side-top perspective. The lower jaw 104 is similarly configured as the lower jaw 300.

The lower jaw 300 includes a circumferential recess 302 and a central recess 304. The circumferential recess 302 is adapted and configured to couple with a bottom portion of a mouth wall, such as the mouth wall 108, thereby providing a seal such that any food content within the interior chamber is contained and does not leak out of the mouth model 100. The central recess 304 is adapted and configured to receive a tongue pad, such as the tongue pad 106, to simulate the human tongue. The lower jaw 300 also has a top surface 306 abutting the tongue pad 106. Circumferential "teeth" of the upper jaw 102 are positionally aligned with the top surface 306. The tongue pad 106, when coupled to the central recess 304, extends beyond the top surface 306.

Tongue Pad.

When the mouth model 100 is assembled, the tongue pad 106 is coupled with the lower jaw 104 and is located at the bottom of the mouth model 100. The tongue pad 106 is a rounded compressible pad. In an embodiment, the tongue pad 106 is made of silicone or another suitable material with a desired elasticity to absorb a "chewing" force and to aid in the movement of food and fluids for a better mixing of the components. The tongue pad 106 is sized and adapted to couple within a central recess of the lower jaw 104. In an embodiment, the tongue pad 106 has a radius of approximately 23 mm, although other sizes are contemplated, depending on the diameter of the central recess of the lower jaw 104. In an embodiment, the material of the tongue pad is resistant to hot and cold temperatures.

Figure 4:
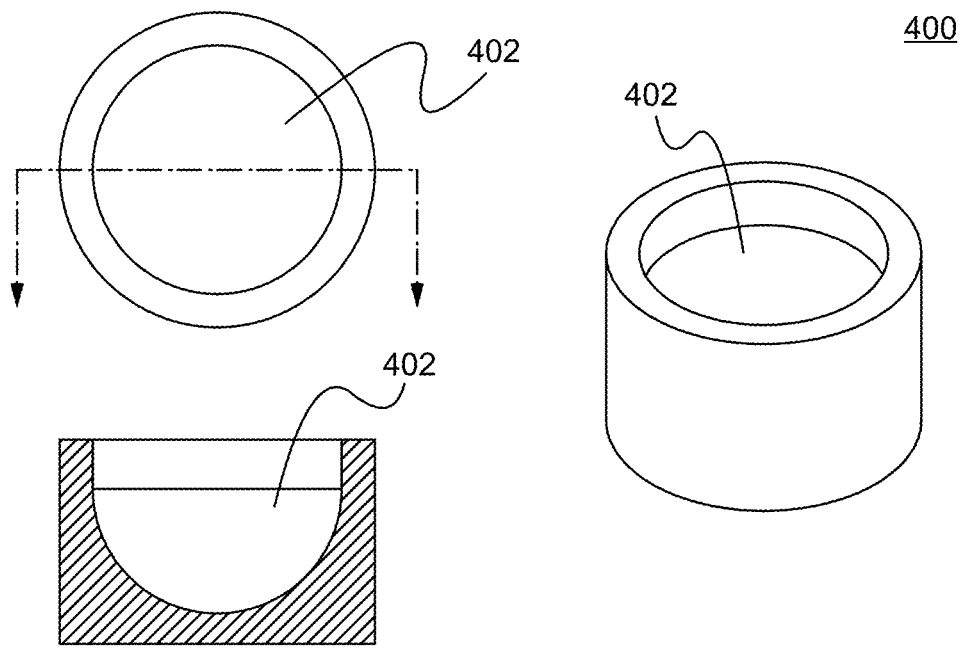
FIG. 4 illustrates different perspectives of an example tongue mold, according to an embodiment.

FIG. 4 illustrates different perspectives of an example tongue mold 400, including a top perspective, a side perspective, and a side-top perspective. The mold 400 has a cavity 402 to provide a particular or desired shape (e.g., rounded, etc.) of the tongue pad 106.

Mouth Wall.

Figure 5:
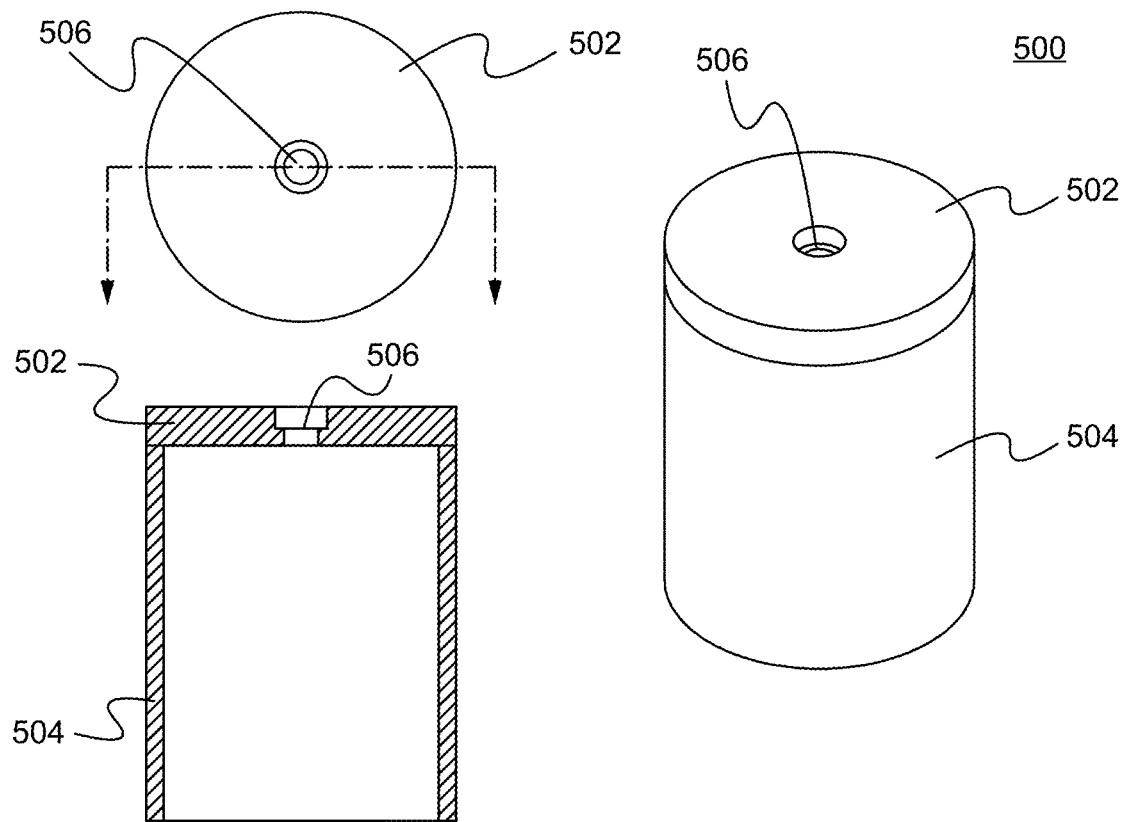
FIG. 5 illustrates different perspectives of an example mouth wall, according to an embodiment.

When the mouth model 100 is assembled, the mouth wall 108 and the lower jaw 104 are coupled to form the interior chamber of the mouth model 100 and to provide a seal such that any food content within the interior chamber is contained and does not leak out of the mouth model 100. FIG. 5 illustrates different perspectives of an example mouth wall 500, including a top perspective, a side perspective, and a side-top perspective. The mouth wall 108 is similarly configured as the mouth wall 500.

The mouth wall 500 has a body that is cylindrically shaped, although other shapes are contemplated, and includes a top surface 502 and a side surface 504. The top surface 502 includes an aperture 506 sized and configured to receive a piston (not illustrated in FIG. 5). The mouth wall 500 allows for food sample(s) subjected to in vitro mastication to remain within the interior chamber of the mouth model when assembled.

The mouth wall 500 includes at least one inlet hole to allow for injection/addition of simulated saliva fluid into the interior chamber of the mouth model. In an embodiment, the at least one inlet hole includes at least two inlet holes, located opposite from each other near a bottom of the mouth wall 500 (e.g., near a bottom end of the body that is opposite from the top surface 502). For example, the at least one inlet hole may be in the side surface 504 and positioned at or below the rounded portion of the tongue pad 106, when the mouth model 100 is assembled. For another example, the at least one hole may be in the side surface 504 and positioned approximately 1 mm above the top of the rounded portion of the tongue pad 106, when the mouth model 100 is assembled. In an embodiment, the at least one inlet hole may be located anywhere on the mouth wall 500 so long as simulated saliva fluid, when injected therein, interacts with food sample, for example, during simulated chewing.

Figure 6A:
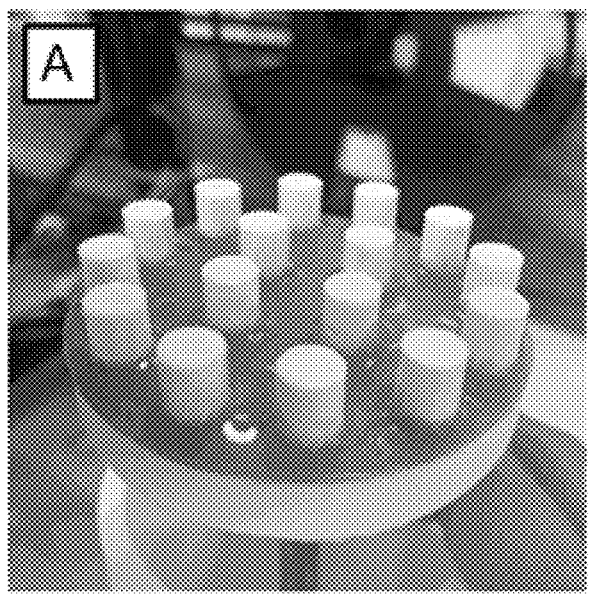
FIG. 6A shows a graphical image depicting an upper jaw, according to an embodiment.
Figure 6B:
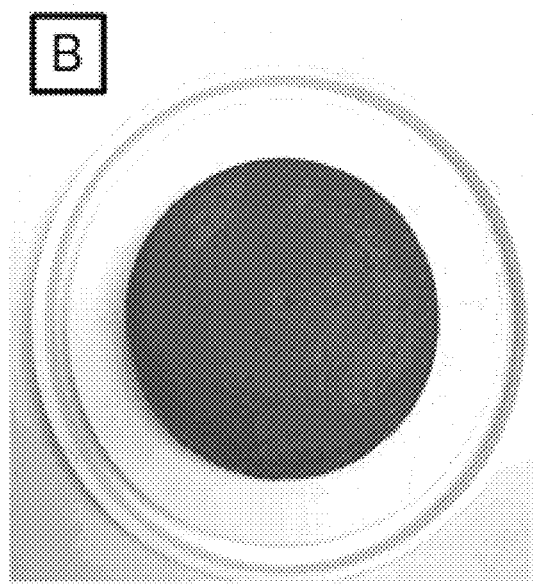
FIG. 6B shows a graphical image depicting a lower jaw coupled with a tongue pad, according to an embodiment.
Figure 6C:
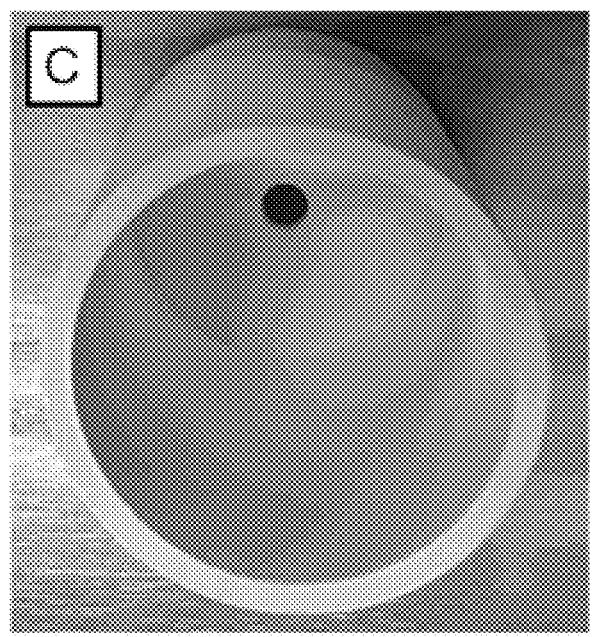
FIG. 6C shows a graphical image depicting a mouth wall, according to an embodiment.

FIGS. 6A, 6B, and 6C show graphical images depicting an upper jaw, a lower jaw coupled with a tongue pad, and a mouth wall, respectively, according to an embodiment. In an embodiment, the mobile upper jaw has a diameter of approximately 65.6 mm, the central recess of the lower jaw has a diameter of approximately 46 mm, and the mouth wall has an inner diameter of approximately 66.2 mm.

Mouth Model System and Environment.

Figure 7A:
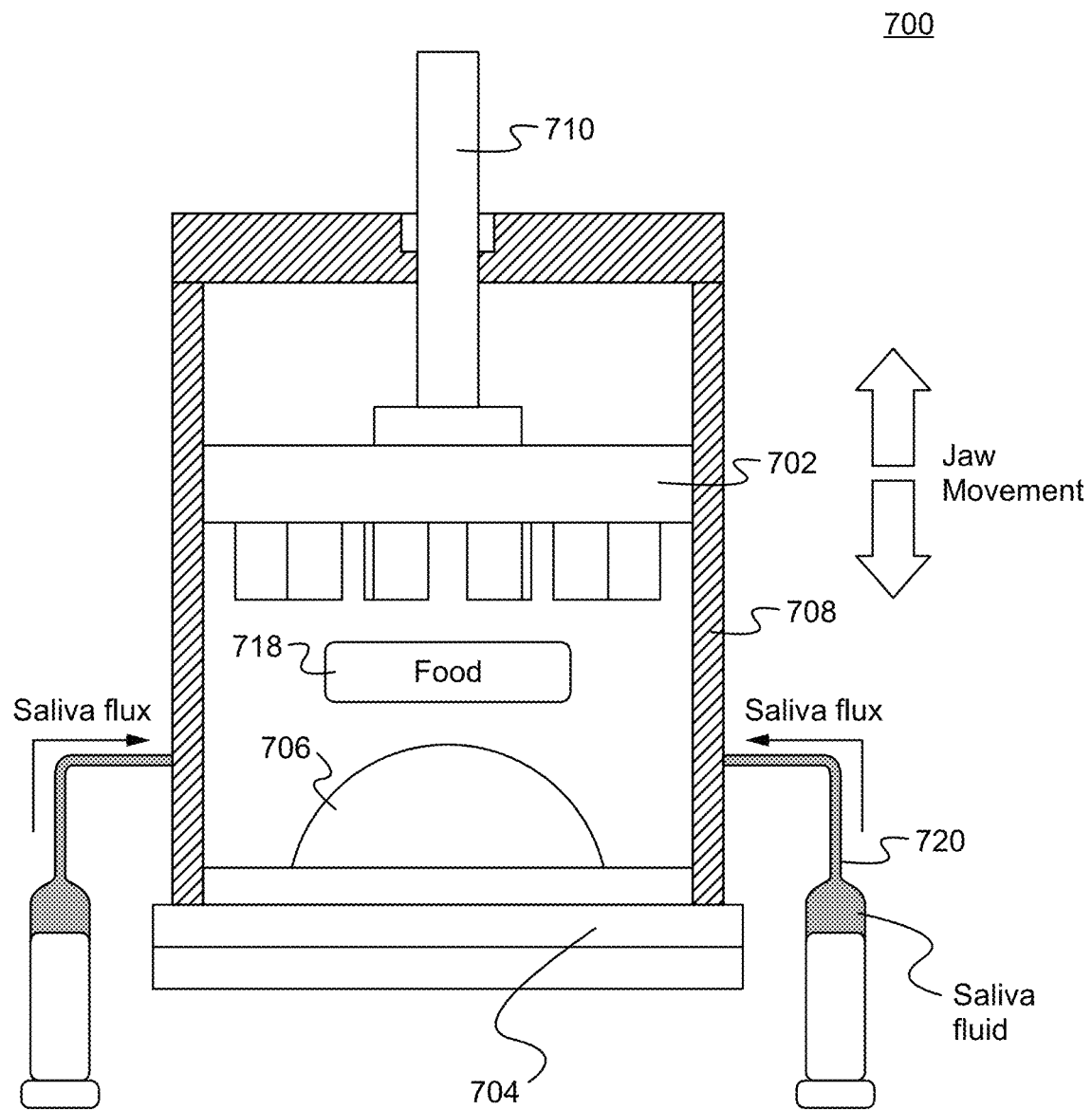
FIG. 7A illustrates a diagram of an example a mouth model system, according to an embodiment.

FIG. 7A illustrates a diagram of an example a mouth model system 700, according to an embodiment. The mouth model system 700 includes a mouth model that includes an upper jaw 702, a lower jaw 704, a tongue pad 706, and a mouth wall 708. The upper jaw 702 is similarly configured as the upper jaw 102 of FIGS. 1A and 1B; the lower jaw 704 is similarly configured as the upper jaw 104 of FIGS. 1A and 1B; the tongue pad 706 is similarly configured as the tongue pad 106 of FIGS. 1A and 1B; and, the mouth wall 708 is similarly configured as the mouth wall 108 of FIGS. 1A and 1B. The mouth model system 700 also includes a fluid source(s) 720 and a piston 710.

As illustrated in FIG. 7A, an end of the piston 710 is inserted through an aperture at the top of the mouth wall 708 and coupled to a neck of the upper jaw 702. As further described herein, the piston 710 may be actuated to repeatedly move the upper jaw 702 up and down to mimic human oral mastication or human jaw movement. When in use, the upper jaw 702 may move anywhere between an open jaw position and a closed jaw position. For example, an open jaw position may be when the upper jaw 702 is at a location within the mouth model that is not in contact with the lower jaw 704, the tongue pad 706, or both. A closed jaw position may be when the upper jaw 702 is at a location within the mouth model that is in contact with the lower jaw 704, the tongue pad 706, or both.

One or more fluid sources 720 are in fluid connection with the interior chamber of the mouth model. For example, simulated saliva fluid from the one or more fluid sources 720 is delivered therefrom to the interior chamber via at least one inlet hole of the mouth wall 708 (two inlet holes shown in FIG. 7A) before, during, and/or after human jaw movement.

In an embodiment, an environment of the mouth model system 700 may include the mouth model system 700 and a computing device for controlling the mouth model system 700. The computing device may be one or more computers, such as one or more desktop computers, laptop computers, server computers, a server farm, a cloud computing platform, a parallel computer, virtual computing instances in public or private datacenters, and/or instances of a server-based application.

Figure 7B:
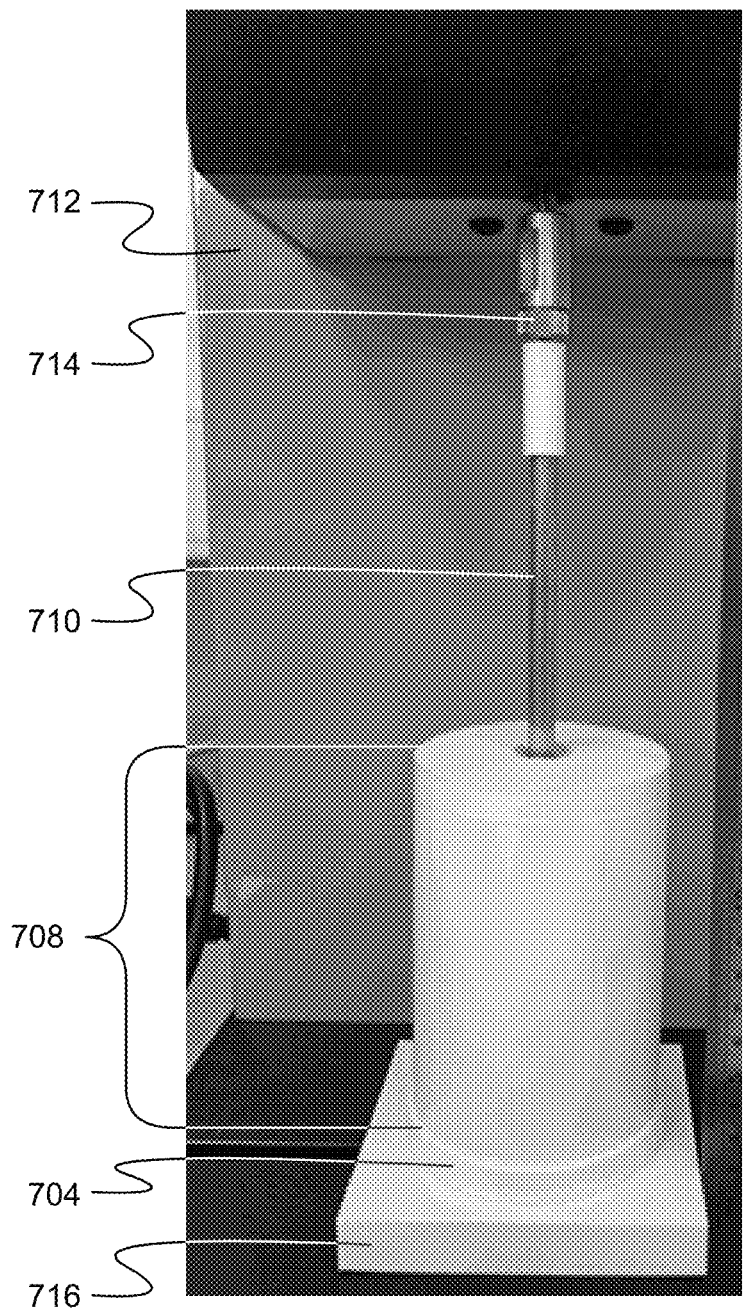
FIG. 7B shows a graphical image depicting the mouth model system, according to an embodiment.

In an embodiment, the computing device may include a texturometer for simulating complex human interactions and replicating such conditions. FIG. 7B shows a graphical image of the mouth model system 700 (without the fluid sources 720) coupled to a texturometer 712 via a texturometer adapter 714. In FIG. 7B, the mouth model system 700 is shown as being positioned on a platform 716. The texturometer 712 is configured to automatically activate the piston 710, which in turn enables jaw movement.

In an embodiment, the computing device (e.g., texturometer and/or another computer) may be coupled, indirectly or directly, to a data repository that includes an experiments database. As used herein, the term "database" refers to a corpus of data, organized or unorganized, in any format, with or without a particular interface for accessing the corpus of data. Each database may be implemented using memory, e.g., RAM, EEPROM, flash memory, hard disk drives, optical disc drives, solid state memory, or any type of memory suitable for database storage. In an embodiment, the experiments database includes different digital data reports generated by the computing device. Digital data reports generated by the computing device may be automatically named based on, for example, sample name or experiment date, and may be automatically stored in the experiments database according to a particular data structure that allows the digital data reports and/or multimedia files to be served and/or read as quickly as possible.

The environment of the mouth model system 700 may also include a peristaltic or syringe pump (not illustrated in FIG. 7B) for delivering fluid from the one or more fluid sources 720 to the mouth model. The peristaltic pump may be operated manually or may be communicatively coupled with the computer device (wired or wirelessly using Bluetooth or the like) for automatically operating the peristaltic pump.

The environment of the mouth model system 700 may also include a static, dynamic or a semi-dynamic digestion model (not illustrated in FIG. 7B) for simulating human gastrointestinal conditions. An example dynamic digestion model is described in co-pending provisional application 63/303,148, filed Jan. 26, 2022, and co-pending patent application Ser. No. 17/835,750, filed Jun. 8, 2022, the entire contents of which are hereby incorporated by reference for all purposes as if fully set forth herein. In an embodiment, the mouth model may be in fluid communication with the dynamic digestion model. For example, food bolus ("chewed" food) from the mouth model may be pumped or otherwise automatically transferred to the dynamic digestion model via a tube.

3.0 Functional Overview

Figure 8B:
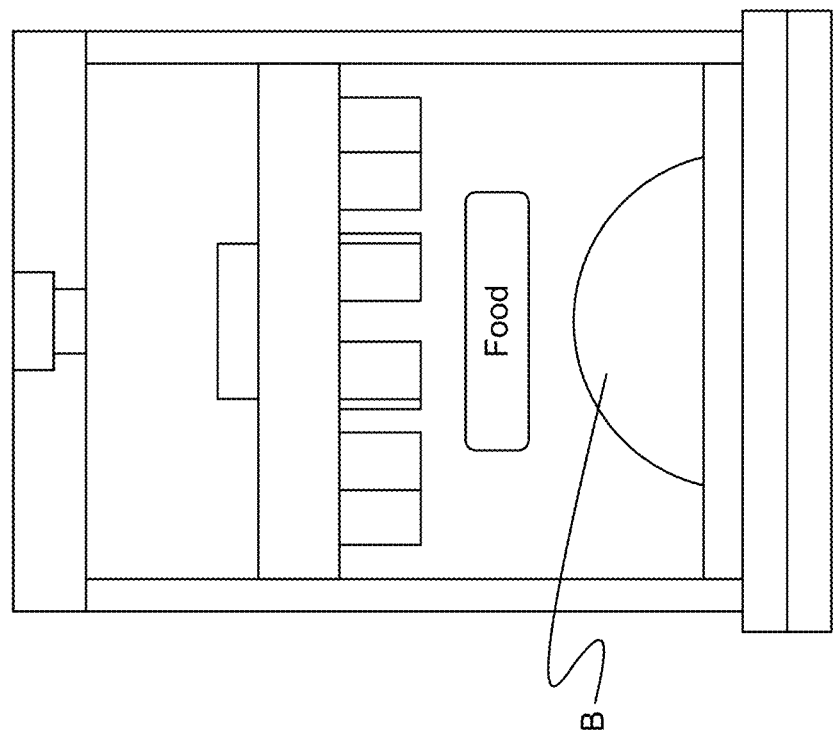
FIGS. 8A and 8B illustrate diagrams of how food is placed in the mouth model, according to an embodiment.
Figure 8A:
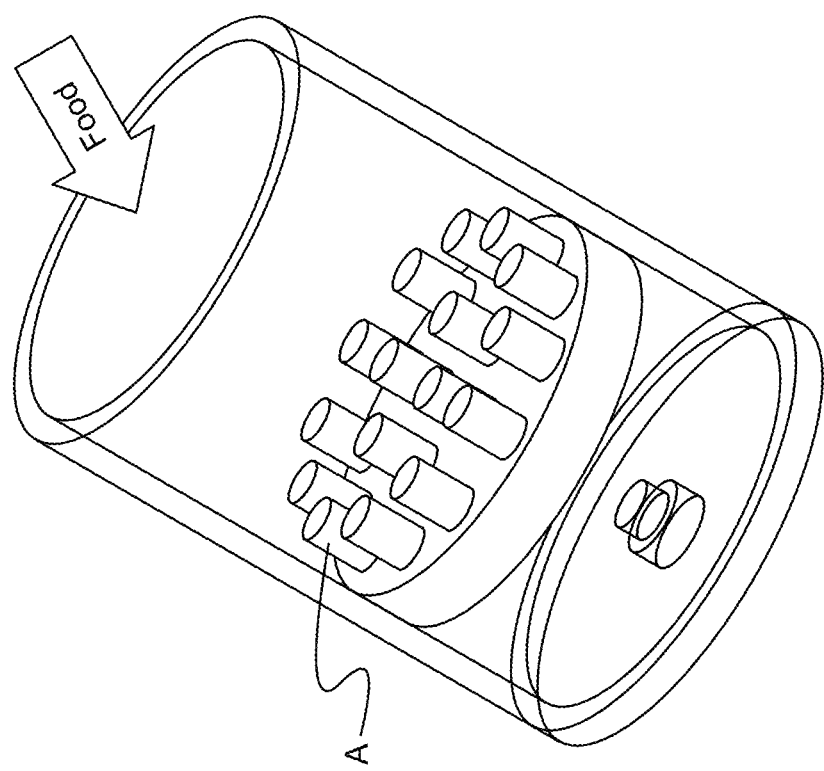

Referring back to FIG. 7A, at least some parts of the mouth model system 700, when assembled and operated, simulate human oral mastication of food sample 718 that is located in the interior chamber of the mouth model. The food sample 718 may be added to the mouth model from the bottom of the mouth model. For example, the food sample 718 may be placed on the "teeth" (identified as "A") of the upper jaw 702 when the mouth wall 708 is decoupled from the lower jaw 704, as illustrated in FIG. 8A. When the lower jaw 704 is coupled to the mouth wall 708, the food sample 718 is positioned between the "teeth" and the "tongue" (identified as "B") or, more generally, between the upper jaw 702 and the lower jaw 704, as illustrated in FIG. 8B.

In an embodiment, simulation of the masticatory process ("chewing" process) includes a piston-like movement of the upper jaw 702 that minces and cuts food samples located within the mouth model. This movement can be generated manually or by attaching the mouth model system 700 to a machine or instrument (e.g., the texturometer 712 of FIG. 7B) that functions as a piston controller. The texturometer 712 additionally allows control of the masticatory force applied to the mouth model. The piston 710 is attached to the mouth model and to the texturometer 712 to apply necessary or desired force to simulate human chewing. In an embodiment, the mouth model is coupled with an adapter, such as the texturometer adaptor 714 of FIG. 7B, which in turn is coupled with the texturometer 712. The texturometer 712 not only applies a masticatory force but also generates digital data during simulated human oral mastication. The digital data may be collected using software executing on the texturometer 712 and/or another computing device.

The software may generate multiple digital data reports that are automatically formatted, named, and saved as files of one or more different formats (e.g., EXCEL spreadsheet, text files, etc.) The computing device may generate a file name for each of the digital data reports created for mastication process. The computing device may store the digital data reports in a data repository. In an embodiment, if the data repository is a file system, then $DATE/EXPERI- MENT_NAME may be the directory structure for a filesystem-based data repository, where $DATE identifies the date of a digestion experiment, and $EXPERIMENT_NAME identifies a digestion experiment. Using such as directory structure allows experiment files to be stored together for easy, convenient access. When an API call specifying an experiment date and an experiment name, corresponding files are identified and accessed. In an embodiment, the computing device alerts a user (e.g., the user in charge) that digital files are ready to be accessed.

As illustrated in FIGS. 7A and 7B, the texturometer 712 is indirectly coupled with the upper jaw 702 via the piston 710. When the texturometer 712 begins to work, the upper jaw 702 applies force to the lower jaw 704 with as many repetitions as desired and until the food sample 718 has a similar texture and consistency as food bolus. In certain situations, desired forces (e.g., constant force, varying forces, etc.) are automatically applied throughout the whole process to obtain a smaller margin of error when applying the simulated saliva fluid.

As discussed herein, during jaw movement, the upper jaw repeatedly moves from an open jaw position to a closed jaw position. For example, an open jaw position may be a position within the mouth model where there is sufficient space between the upper jaw and the tongue pad to place food samples, and the closed jaw position may be a position within the mouth model where the upper jaw contacts the tongue pad, the top surface of the lower jaw, or both. The interior chamber repeatedly decreases and increases in size as the upper jaw repeatedly moves between the closed position and the open position.

The force applied during chewing may be based on literature or experiments and may be set up (programmed) in the texturometer or any other computing device used to apply force. During jaw movement, for a more realistic simulation of human mastication, simulated saliva fluid can be added to the mouth model through the one or more inlet holes present in the mouth wall. In an embodiment, the simulated saliva may be added into the mouth wall using syringes, containing the simulated saliva and connected to plastic tubes. This process can be made manually or can be made automatically by coupling the syringes to automated flux controllers, such as a peristaltic pump that will control the amount and rate at which the fluid enters the mouth model. The peristaltic pump can be communicatively coupled with the computer device with wires or wirelessly (e.g., Bluetooth or the like) for automatic operation or can be operated manually. An amount and flow rate may be also set up (e.g., programmed) in the computing device.

The tongue pad 706 has the dual function of absorbing the chewing force and recreating the saliva-food mixture movement in the human mouth.

4.0 Mouth Model Features

In an embodiment, the mouth model 100 includes 3D printed parts, making the mouth model system easily customizable. For example, the upper jaw 102, the lower jaw 104, and the mouth wall 108 are a 3D printed. Similarly, the tongue mold can be 3D printed. The upper jaw 102, the lower jaw 104, and the mouth wall 108 may be a polylactic acid (PLA) upper jaw, a PLA lower jaw, and a PLA mouth wall, respectively, printed using a 3D printer. These parts can be easily redesigned (modified) by a user for different requirements. For example, an aperture on a top surface of the mouth wall 108 can be made smaller or larger to receive a piston of a different size. For another example, more inlet holes can be added to the mouth wall 108. For yet another example, more "teeth" can be added to the upper jaw 102.

Main materials of the mouth model 100 include PLA and silicone, keeping development, construction, and use costs of the mouth model low.

The mouth model 100 is compact in size. In an embodiment, the mouth model 100 is approximately 66.2 mm in diameter and 110.0 mm in height. The mouth model 100 is portable and can be used anywhere and stored when not in use. The mouth model 100 may be operated in different modes. For example, the mouth model 100 may be manually used or may be automatically used (e.g., coupled to a texturometer) for automated processing. The movement of the upper jaw (either manually or automatically) mimics the up-and-down movement of the human jaw.

Food samples may be solid or semi-solid food samples. In an embodiment, an initial volume of food sample may be similar to that of a human bite. Simulated saliva fluid and/or other fluids may be added manually or automatically using pumps during mastication. The structure of the upper jaw and the lower jaw, as well as the teeth and the tongue, mimic human mastication of food.

Mastication force applied may be an average between the force employed by men and women, an average force employed by men, or an average force employed by women. In an embodiment, the mastication force is programmable at the texturometer and/or the computing device. Similarly, mastication force may be modulated depending on whether the biting force being reproduced is that of children or the elderly.

In an embodiment, the physiological temperature of food bolus masticated in vitro is maintained, such as at a temperature between 36.11° C. and 37.56° C. The desired temperature can be achieved by cooking the food sample at/to a certain temperature and heating the saliva fluid at/to a certain temperature, resulting in a final temperature between 36.11° C. and 37.56° C. after mixing both during mastication. In an embodiments, for cold food samples or at room temperature food samples, the mouth model and the saliva fluid are kept inside an incubator at 37° C. up until mastication time. Since mouth mastication and digestion take less than 15 seconds, the bolus temperature resembles what happens during human mastication of cold, room temperature, and hot foods. Bolus macronutrient composition (e.g., "chewed" food in the mouth model) reproduces that of a physiologically chewed bolus.

5.0 Other Aspects of Disclosure

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A system comprising:
   a mouth model comprising:
      an upper jaw comprising a neck and a plurality of protrusions;
      a lower jaw comprising a central recess;
      a compressible pad coupled to the central recess of the lower jaw; and
      a mouth wall comprising an aperture on a top surface of the mouth wall and a side surface for removably coupling with the lower jaw; and
   a piston configured to be inserted through the aperture of the mouth wall and removably coupled with the neck of the upper jaw.

2. The system of claim 1, wherein the mouth wall further comprises at least one inlet hole.

3. The system of claim 2, further comprising at least one fluid source storing simulated saliva fluid for delivery into the mouth model through the at least one inlet hole.

4. The system of claim 3, further comprising a pump coupled with the at least one fluid source, wherein the pump delivers the simulated saliva fluid into the mouth model.

5. The system of claim 1, wherein the lower jaw comprises a circumferential recess adapted to receive the side surface of the mouth wall.

6. The system of claim 1, wherein when the compressible pad is coupled to the central recess of the lower jaw, the compressible pad extends beyond a surface of the lower jaw that abuts the compressible pad.

7. The system of claim 1, further comprising a computing device coupled with the piston, wherein the computing device controls movement of the piston and records data during simulated human oral mastication.

8. The system of claim 1, wherein the lower jaw and the mouth wall forms an interior chamber when the mouth model is assembled.

9. The system of claim 1, wherein a size of the interior chamber fluctuates during simulated human oral mastication.

10. The system of claim 1, wherein the upper jaw is configured to move towards and away from the lower jaw.

11. The system of claim 1, further comprising a digestion model in fluid communication with the mouth model.

12. A method comprising:
    coupling a first end of a piston to a neck of an upper jaw;
    inserting a second end of the piston through an aperture of a mouth wall;
    forming an interior chamber using a lower jaw and the mouth wall;
    fluidly coupling at least one fluid source with the interior chamber;
    using the piston to alternate between decreasing and increasing a size of the interior chamber; and
    while using the piston, transferring fluid from the at least one fluid source to the interior chamber.

13. The method of claim 12, further comprising coupling the piston to a texturometer.

14. The method of claim 12, further comprising using one or more controllers to at least one of automatically move the piston between an open jaw position and a closed jaw position, to apply one or more desired piston forces, and to transfer the fluid from the at least one fluid source.

15. The method of claim 12, wherein the upper jaw further comprises a plurality of protrusions.

16. The method of claim 12, wherein the lower jaw comprises:
    a central recess adapted to receive a compressible pad; and
    a circumferential recess adapted to receive a side surface of the mouth wall.

17. The method of claim 16, wherein the compressible pad is configured to absorb force of the piston when the upper jaw contacts the compressible pad.

18. The method of claim 16, wherein when in a closed jaw position, the upper jaw contacts at least the compressible pad.

19. The method of claim 12, wherein the mouth wall further comprises at least one inlet hole for adding the fluid into the interior chamber.

20. The method of claim 12, further comprising automatically transferring food bolus from the interior chamber to a fluidly coupled digestion model.

* * * * *